US009524441B2

(12) United States Patent
Yu et al.

(10) Patent No.: US 9,524,441 B2
(45) Date of Patent: Dec. 20, 2016

(54) SYSTEM AND METHOD FOR IDENTITY AUTHENTICATION BASED ON FACE RECOGNITION, AND COMPUTER STORAGE MEDIUM (71) Applicant: TENCENT TECHNOLOGY (SHENZHEN) COMPANY LIMITED, Shenzhen, Guangdong (CN)

(72) Inventors: Xin Yu, Shenzhen (CN); Lei Qin, Shenzhen (CN); Yuhui Hu, Shenzhen (CN); Yunyun Hao, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 210 days.

(21) Appl. No.: 14/449,793

(22) Filed: Aug. 1, 2014

(65) Prior Publication Data
US 2014/0341445 A1 Nov. 20, 2014

Related U.S. Application Data (63) Continuation of application No. PCT/CN2013/073807, filed on Apr. 7, 2013.

(30) Foreign Application Priority Data

May 4, 2012 (CN) .......................... 2012 1 0137251

(51) Int. Cl.
G06K 9/00 (2006.01)
G06F 21/32 (2013.01)
(52) U.S. Cl.
CPC ........... *G06K 9/00899* (2013.01); *G06F 21/32* (2013.01); *G06K 9/00261* (2013.01); *G06K 9/00275* (2013.01); *G06K 9/00288* (2013.01)

(58) Field of Classification Search
CPC ...... G06F 21/32; G06F 21/42; G06K 9/00275; G06K 9/00899
See application file for complete search history.

(56) References Cited

U.S. PATENT DOCUMENTS

2005/0044143 A1    2/2005 Zimmermann et al.
2014/0165187 A1*   6/2014 Daesung ............ G06K 9/00335
                                                            726/19

FOREIGN PATENT DOCUMENTS

CN    101114909 A    1/2008
CN    101216887 A    7/2008

OTHER PUBLICATIONS

State Intellectual Property Office of the P. R. China (ISA/CN), "International Search Report" for PCT/CN2013/073807, Jul. 11, 2013, China.

\* cited by examiner

*Primary Examiner* — Siamak Harandi
(74) *Attorney, Agent, or Firm* — Tim Tingkang Xia, Esq.; Locke Lord LLP (57) ABSTRACT

The present disclosure relates to a method for identity authentication based on face recognition. The method comprises: initiating an interaction authentication request, which includes requested interaction tracks, and sending the interaction authentication request to an authentication client; receiving face interaction information sent by the authentication client; extracting face action tracks from the face interaction information; determining whether the face action tracks are consistent with the requested interaction tracks; if the face action tracks are consistent with the requested interaction tracks, determining that the authentication is passed, otherwise determining that the authentication fails. The above solution could prevent the authentication server from being cheated by face pictures or videos taken previ- (Continued)

ously and could ensure that the face pictures or videos passing the authentication is taken in real time from a real person. Besides, the present disclosure relates to a system for identity authentication based on face recognition and computer storage medium.

19 Claims, 5 Drawing Sheets

SYSTEM AND METHOD FOR IDENTITY AUTHENTICATION BASED ON FACE RECOGNITION, AND COMPUTER STORAGE MEDIUM

CROSS-REFERENCE TO RELATED APPLICATIONS

The present application is a continuation application of International Application PCT/CN2013/073807, filed Apr. 7, 2013, which itself claims the priority to Chinese application No. 201210137251.5, filed May 4, 2012, which are incorporated herein by reference in their entireties.

TECHNICAL FIELD

The present disclosure relates generally to the field of identity authentication technology, and more particularly, to systems and methods for identity authentication based on face recognition, and computer storage medium thereof.

BACKGROUND

Biological characteristic authentication is a sort of identity authentication using human biological characteristics, such as voice, fingerprint, iris and signature. As an accurate, fast and efficient identity authentication, biological characteristic authentication is becoming more and more widely used in various fields that require authentication. Amongst biological characteristic authentications, face identity authentication which is based on face recognition is one of the most popular biological characteristic authentication.

Conventional face identity authentication methods collect standard face picture, extract the feature data from the standard face picture and store the feature data as the template in a database in an authentication server. When it is required for identity authentication, feature data is extracted from an inputted face picture, and subsequently compared with the template that is previously stored in the database. If the feature data matches the template, the authentication is passed, otherwise the authentication fails.

When the conventional face identity authentication is applied to the internet, the internet client and the authentication server are not in an equally real environment, the authentication server cannot distinguish whether the inputted face picture or video is acquired exactly from a real person or a duplicated fake that is taken previously. A malicious third party may input a face picture or video taken previously to deceive the authentication server, and if the picture or video pass the authentication, users' accounts and virtual property will be robbed, resulting in great risk to the security of users' internet applications.

Therefore, heretofore unaddressed needs exist in the art to address the aforementioned deficiencies and inadequacies.

SUMMARY OF THE INVENTION

According to the question that the authentication server could be cheated by a face picture or video taken previously, it is necessary to provide a method and a system for identity authentication based on face recognition, and a computer storage medium thereof, which could prevent the authentication server from being cheated by a face picture or video taken previously and could ensure that the face picture or video passing the authentication is taken in real time from a real person.

In one aspect, the present disclosure relates to a method for identity authentication based on face recognition. In one embodiment, the method comprises initiating an interaction authentication request which comprises requested interaction tracks, and sending the interaction authentication request to an authentication client; receiving face interaction information sent by the authentication client; extracting face action tracks from the face interaction information; and determining whether the face action tracks are consistent with the requested interaction tracks.

In another aspect, the present disclosure relates to a system for identity authentication based on face recognition. In one embodiment, the system comprises an authentication client and an authentication server; the authentication server comprising an interaction authentication unit; the interaction authentication unit is configured to initiate an interaction authentication request which comprises requested interaction tracks, and to send the interaction authentication request to the authentication client; the authentication client is used for obtaining face interaction information and sending the face interaction information to the authentication server; the interaction authentication unit is further configured to extract face action tracks from the face interaction information, and to determine whether the face action tracks are consistent with the requested interaction tracks.

In yet another aspect, the present disclosure relates to an authentication server comprising a storage medium and at least one processor, wherein the storage medium is used for storing at least one program executable by the at least one processor; the at least one program comprises:

a first unit, configured to initiate an interaction authentication request which comprises requested interaction tracks, and to send the interaction authentication request to an authentication client;

a second unit, configured to receive face interaction information sent by the authentication client;

a third unit, configured to extract face action tracks from the face interaction information; and a fourth unit, configured to determine whether the face action tracks are consistent with the requested interaction tracks.

In a further aspect, the present disclosure relates to a computer readable storage medium storing at least one program executable by at least one processor to perform a method for identity authentication based on face recognition; wherein the computer readable storage medium is comprised in an authentication server; and the method comprises:

initiating an interaction authentication request which comprises requested interaction tracks; and sending the interaction authentication request to an authentication client;

obtaining face interaction information from the authentication client;

extracting face action tracks from the face interaction information; and determining whether the face action tracks are consistent with the requested interaction tracks.

According to the above system and method for identity authentication based on face recognition, the authentication server and the computer storage medium, after an interaction authentication request is initiated, face interaction information is obtained, and then face action tracks are extracted from the face interaction information, if the face action tracks are consistent with the requested interaction tracks, the authentication is passed, otherwise the authentication fails. Consequently, during the process of authentication, as to pass the authentication, face has to generate some action tracks. However the face in the pictures or videos which are taken previously, used by a third party, is static and fixed, and the face cannot generate any action track according to the interaction authentication request. Wherefore the above system and method for identity authentication based on face recognition, the authentication server and the computer storage medium, as compared with conventional solution using static face pictures and videos for authentication, could prevent the authentication server from being maliciously deceived by face pictures or videos taken previously and could ensure that the face pictures or videos passing the authentication is taken in real time from a real person, and thus could improve the security of various kinds of Internet applications.

These and other aspects of the present disclosure will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

DESCRIPTION OF THE PREFERRED EMBODIMENTS

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are configured to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more operations within a method is executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules is executed using a single (shared) processor. In addition, some or all code from multiple modules is stored by a single (shared) memory. The term "group", as used herein, means that some or all code from a single module is executed using a group of processors. In addition, some or all code from a single module is stored using a group of memories.

As used herein, the term "server" refers to a system including software and suitable computer hardware that responds to requests across a computer network to provide, or help to provide, a network service.

The systems and methods described herein are implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Figure 1:
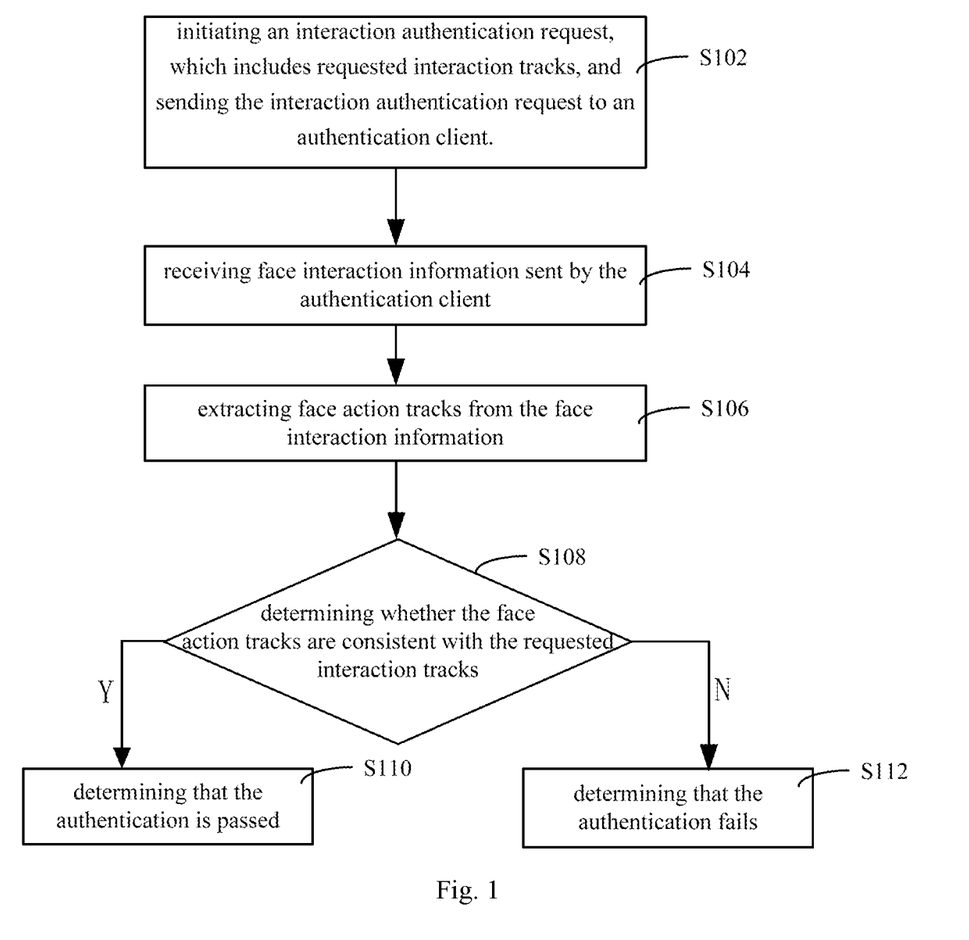
FIG. 1 is a flow diagram of a method for identity authentication based on face recognition according to one embodiment of the present disclosure.

Referring to FIG. 1, according to one of the embodiments, a method for identity authentication based on face recognition is executed by an authentication server based on a computer system. The method includes steps as follows:

Step S102, initiating an interaction authentication request which includes requested interaction tracks, and sending the interaction authentication request to an authentication client.

Step S104, receiving face interaction information sent by the authentication client.

Step S106, extracting face action tracks from the face interaction information.

Step S108, determining whether the face action tracks are consistent with the requested interaction tracks, step S110 is followed if yes, or step S112 is followed if no.

Step S110, determining that the authentication is passed.

Step S112, determining that the authentication fails.

Specifically, the interaction authentication request could be initiated when an application operating request is received. This application operating request could be a user's registering request, payment request or download request, etc. The interaction authentication request includes requested interaction information. The requested interaction tracks, carrying information about face rotation, face translation and target area thereof, could be randomly assigned in the requested interaction information. The face action tracks are feature data used for representing the tracks generated during physical movement of human face, which could include face rotational tracks and face translational tracks. The face rotational tracks are feature data used for representing face rotations, and the face translational tracks are feature data used for representing face translations.

It should be noted that, in the field of image recognition, the face action tracks are consistent with the requested interaction tracks shall not mean that the face action tracks should be exactly the same as the requested interaction tracks. Instead, it shall have the meaning that the similarity between the face action tracks and the requested interaction tracks is within a predetermined scope. In the current embodiment and the following embodiments, the 'consistent' has its normal technologic meaning in the field of image recognition, as quoted above.

In the current embodiment, face interaction activities could be executed following the requested interaction tracks after the interaction authentication request is received. The face interaction information could be obtained by tracking the face interaction activities, and the face action tracks could be extracted from the face interaction information. If the face action tracks are consistent with the requested interaction tracks, the authentication is passed, otherwise the authentication fails. This solution, using dynamic face action tracks for authentication, as compared with conventional solution using static face pictures and videos for authentication, could prevent the authentication server from being maliciously deceived by face pictures or videos taken previously and could ensure that the face pictures or videos passing the authentication is taken in real time from a real person, and thus could improve the security for various internet applications.

According to one of the embodiments, the authentication client could receive the interaction authentication request sent by the authentication server and obtain the inputted face interaction information. And before obtaining the inputted face interaction information, the authentication client could generate interaction authentication indications according to the interaction authentication request and display the interaction authentication indications. As a result, the user could execute relevant face interaction activities according to the interaction authentication indications. For example, the interaction authentication indications could note that the user should shift his/her face left to a specified target area, etc.

Further, according to one of the embodiments, when the user executes relevant face interaction activities according to the interaction authentication indications, the authentication client could obtain the face interaction information. The authentication client obtaining the face interaction information could comprise: the authentication client tracking the face interaction activities made by the user following the interaction authentication indications; taking pictures or videos of the user's face interaction activities; extracting the face interaction information according to the interaction authentication request. And the face interaction information could be the face pictures or face videos that are taken during a preset time period. The face interaction activities, executed by the users following the interaction authentication indications, could form physical tracks in real space. They are processes of physical activities. A series of face pictures, which could represent the process, could be obtained by photographing the process within a specific time period.

For example, the interaction authentication indications note that the face has to move to left and rotate, and finally arrive in a designated target area. In the process of user's execution of the face interaction activities, face pictures could be captured at a prescribed time intervals, such as one picture per second, so as to track the face interaction activities. When user's confirmation instruction to finish the face interaction activities is received, the face interaction information, formed in the process of the face interaction activities, could be extracted. The face interaction information could be the face pictures or face videos that are taken during a preset time period, and for example one frame of image of the face videos is captured per second.

Further, according to one of the embodiments, the interaction authentication request further includes a time period for the face interaction activities. In the current embodiment, the authentication server could obtain the start time and the finish time of the user's face interaction activities, and determine whether the start time and the finish time are within the time period. If the start time and the finish time are within the time period, the authentication server could further determine whether the face action tracks are consistent with the requested interaction tracks, otherwise the authentication server determines that the authentication fails.

In the current embodiment, the time period for the face interaction activities is appointed in the interaction authentication request. For example, it is appointed that the face should move left to a designated target area in 10 s, so the extracted face interaction information could be the face pictures or face videos that are taken in 10 s. Appointing the time period for the face interaction activities in the interaction authentication request, so as to request the user to complete the face interaction activities in the appointed time period, thereby could prevent the authentication server from being deceived by face videos taken previously.

Further, after obtaining the face pictures or face videos that are taken during a preset time period, the authentication server could analyze every frame of picture of the face pictures or face videos, so as to extract the face action tracks, which could include face translational tracks and face rotational tracks.

According to one of the embodiments, the interaction authentication request includes requested face translational interaction track; and the authentication server could determine whether the face translational track among the face action tracks is consistent with the requested face translational interaction track; if the face translational track among the face action tracks is consistent with the requested face translational interaction track, the authentication server could determine that the authentication is passed, otherwise the authentication server determines that the authentication fails.

According to another embodiment, the interaction authentication request includes requested face rotational interaction track; and the authentication server could determine whether the face rotational track among the face action tracks is consistent with the requested face rotational interaction track; if the face rotational track among the face action tracks is consistent with the requested face rotational interaction track, the authentication server could determine that the authentication is passed, otherwise the authentication server determines that the authentication fails.

According to other embodiments, the interaction authentication request includes both requested face translational interaction track and requested face rotational interaction track; and the authentication server could determine whether the face translational track among the face action tracks is consistent with the requested face translational interaction track, and determine whether the face rotational track among the face action tracks is consistent with the requested face rotational interaction track; if the two groups of tracks are both consistent, the authentication server could determine that the authentication is passed, otherwise the authentication server determines that the authentication fails.

Because the face of a real person would generally rotate more or less during the process of translation, further, according to one of the embodiments, the authentication server could determine whether the face action tracks are overlapped with a face rotational track; if the face action tracks are overlapped with a face translational track, the authentication server could determine that the authentication is passed, otherwise the authentication server determines that the authentication fails. This solution, which execute identity authentication by determining whether the face action tracks are overlapped with a face rotational track, could easily be implemented, and could ensure that the authenticity of the identity which passes the authentication.

Figure 2:
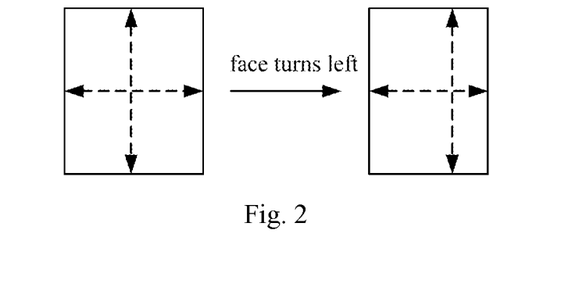
FIG. 2 is a schematic view of the rotational track of the face.

Specifically, during the process of the face interaction activities, which is made by the user following the interaction authentication indications, the face interaction activities could be tracked and a face outline area could be recognized. Referring to FIG. 2, the rectangle in the figure illustrates a face; the vertical axis represents the face mean line, and the horizontal axis represents the left-right width of the face. The face mean line would shift to left of right during the face rotation. So the face rotational track could be the shifting track of the face mean line extracted from the face interaction information. If there is a shifting left or right of the face mean line, face rotation must exist. And the face translational track could be the face shifting path extracted from the face interaction information.

According to one of the embodiments, before initiating the interaction authentication request, the authentication server could receive a first face picture obtained by the authentication client, extract the face feature from the first face picture, and compare the face feature extracted from the first face picture with the pre-stored standard feature data; if the face feature is consistent with the pre-stored standard feature data, the authentication server could enter the step of initiating the interaction authentication request, otherwise the authentication server determines that the authentication fails.

According to one of the embodiments, before obtaining the first face picture, the authentication client could receive a user's registering request and collect the standard face pictures of the user, extract the standard feature data from the standard face pictures, and store the standard feature data. Preferably, the standard face pictures are full face pictures. The standard feature data is used for verifying face pictures.

Specifically, the authentication server could initiate the interaction authentication request when an application operating request of a user is received. When receiving the interaction authentication request, the authentication client could capture the current picture of the user, namely the first face picture. The authentication server could extract the face feature from the first face picture, compare the face feature extracted from the first face picture with the standard feature data which was stored during the process of registering a new user; if the face feature is consistent with the standard feature data, the authentication server could enter the step of initiating an interaction authentication request, otherwise the authentication server determines that the authentication fails.

According to one of the embodiments, the authentication server could further receive a second face picture obtained by the authentication client when the user finishes the face interaction activities, extract the face feature from the second face picture, compare the face feature extracted from the second face picture with the standard pre-stored feature data, and determine whether the face feature from the second face picture is consistent with the pre-stored standard feature data. If the face feature is consistent with the pre-stored standard feature data, the authentication server could determine that the authentication is passed, otherwise the authentication server determines that the authentication fails.

The current embodiment identifies the first face picture captured when the face interaction activities are started and the second face picture captured when the face interaction activities are finished for authentication. As a result, this could ensure the authenticity of the identity which passes the authentication and prevent the authentication server from being deceived, and could further improve the security of internet applications.

Besides, the present disclosure provides a computer storage medium, in which one or more programs are stored; and the one or more programs are executed by a processor or processors to perform the above method for identity authentication based on face recognition. The detailed steps of the one or more programs, stored in the computer storage medium, performing the method for identity authentication based on face recognition is described as the method above, and would not be described herein.

Besides, the present disclosure provides an authentication server. The authentication server includes storage medium and at least a processor, wherein the storage medium has one or more programs stored thereon. As the one or more programs are executable by the processor the programs include:

a first unit, configured to initiate an interaction authentication request which includes requested interaction tracks; and to send the interaction authentication request to an authentication client;

a second unit, configured to receive face interaction information sent by the authentication client;

a third unit, configured to extract face action tracks from the face interaction information;

a fourth unit, configured to determine whether the face action tracks are consistent with the requested interaction tracks.

It should be noted that, the units above are corresponding to the steps S102 to S112, so the implementation details of the units above would not be described herein.

Figure 3:
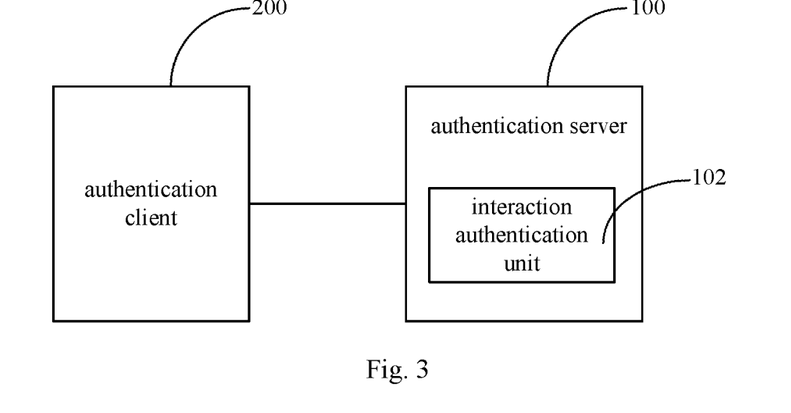
FIG. 3 is a block diagram of a system for identity authentication based on face recognition according to one embodiment of the present disclosure.

Referring to FIG. 3, according to one of the embodiments, a system for identity authentication based on face recognition comprises an authentication server 100 and an authentication client 200; the authentication server 100 includes an interaction authentication unit 102; the interaction authentication unit 102 is configured to initiate an interaction authentication request which includes requested interaction tracks, and to send the interaction authentication request to the authentication client 200; the authentication client 200 is configured to obtain face interaction information and to send the face interaction information to the authentication server 100; the interaction authentication unit 102 is further configured to extract face action tracks from the face interaction information, determine whether the face action tracks are consistent with the requested interaction tracks, and determine that the authentication is passed if the face action tracks are consistent with the requested interaction tracks, or otherwise determining that the authentication fails.

Specifically, the interaction authentication unit 102 could be configured to initiate the interaction authentication request when an application operating request is received. This application operating request could be a user's registering request, payment request or download request, etc. The interaction authentication request includes requested interaction information. The requested interaction tracks, being indicated in the requested interaction information and carrying information about face rotation and face translation, and target area thereof, could be randomly assigned in the requested interaction information.

It should be noted that, that the face action tracks are consistent with the requested interaction tracks shall not mean that the face action tracks should be exactly the same as the requested interaction tracks. If the similarity degree between the extracted face action tracks and the requested interaction tracks is within a predetermined scope, the interaction authentication unit 102 could determine that the face action tracks are consistent with the requested interaction tracks.

In the current embodiment, the user could execute the face interaction activities through following the requested interaction tracks after the interaction authentication request is received. The authentication client 200 could obtain the face interaction information by tracking the face interaction activities, and the interaction authentication unit 102 could extract the face action tracks from the face interaction information. If the face action tracks are consistent with the requested interaction tracks, the authentication is passed, otherwise the authentication fails. This solution, using dynamic face action tracks for authentication, as compared with conventional solution using static face pictures and videos for authentication, could prevent the authentication server from being deceived by face pictures or videos taken previously and could ensure that the face pictures or videos passing the authentication is taken in real time from a real person, and thus could improve the security for various internet applications.

According to one of the embodiments, the authentication client 200 is further configured to generate interaction authentication indications according to the interaction authentication request and displaying the interaction authentication indications.

Figure 4:
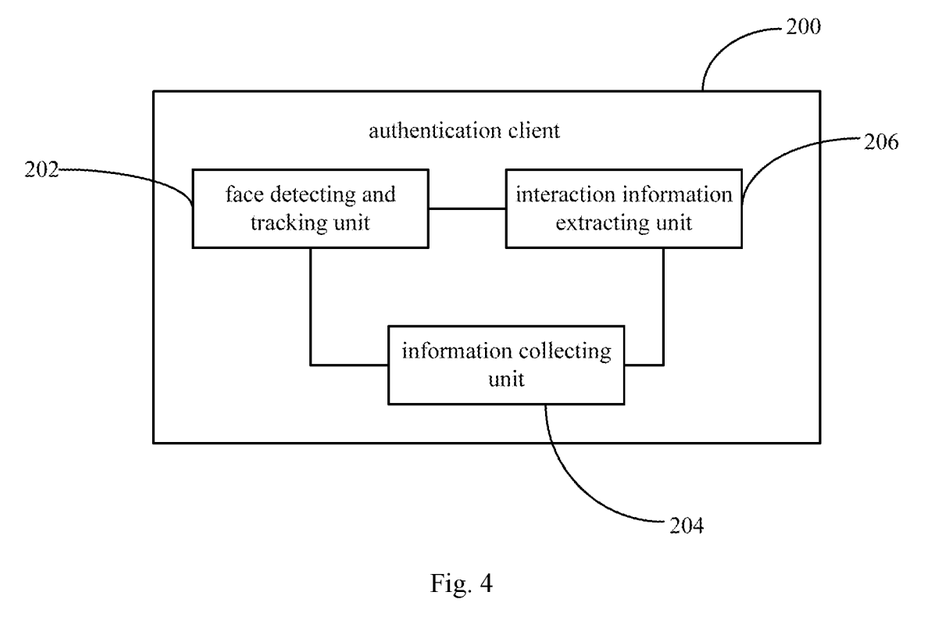
FIG. 4 is a block diagram of an authentication client according to one embodiment of the present disclosure.

Referring to FIG. 4, the authentication client 200 comprises a face detecting and tracking unit 202, an information collecting unit 204 and an interaction information extracting unit 206; the face detecting and tracking unit 202 is configured to track the face interaction activities that are made by the user following the interaction authentication indications; the information collecting unit 204 is configured to take pictures or videos of the user's face interaction activities; the interaction information extracting unit 206 is configured to extract the face interaction information according to the interaction authentication request. And the face interaction information could be the face pictures or face videos that are taken during a preset time period.

Further, according to one of the embodiments, the interaction authentication request further includes a time period for the face interaction activities. In the current embodiment, the interaction authentication unit 102 is further configured to obtain the start time and the finish time of the user's face interaction activities, and to determine whether the start time and the finish time are within the time period. If the start time and the finish time are within the time period, the interaction authentication unit 102 is further configured to determine whether the face action tracks are consistent with the requested interaction tracks, otherwise for determining that the authentication fails.

In the current embodiment, the time period for the face interaction activities is appointed in the interaction authentication request. For example, it is appointed that the face should move left to a designated target area in 10 s, so the face interaction information extracted by the interaction information extracting unit 206 could be the face pictures or face videos that are taken in 10 s. Appointing the time period for the face interaction activities in the interaction authentication request, so as to request the user to complete the face interaction activities in the appointed time period, thereby could prevent the authentication server from being deceived by face videos taken previously.

Further, the interaction information extracting unit 206 could be configured to submit the extracted face pictures or face videos that are taken during a preset time period, to the authentication server 100. And the interaction authentication unit 102 of the authentication server 100 could be further configured to analyze every frame of picture of the face pictures or face videos, so as to extract the face action tracks, which could include face translational tracks and face rotational tracks.

According to one of the embodiments, the interaction authentication request includes requested face translational interaction track; and the interaction authentication unit 102 is configured to determine whether the face translational track among the face action tracks is consistent with the requested face translational interaction track, and if the face translational track among the face action tracks is consistent with the requested face translational interaction track, determine that the authentication is passed, otherwise determine that the authentication fails.

According to another embodiment, the interaction authentication request includes requested face rotational interaction track; and the interaction authentication unit 102 is configured to determine whether the face rotational track among the face action tracks is consistent with the requested face rotational interaction track, and if the face rotational track among the face action tracks is consistent with the requested face rotational interaction track, determine that the authentication is passed, otherwise determining that the authentication fails.

According other embodiments, the interaction authentication request includes both requested face translational interaction track and requested face rotational interaction track; and the interaction authentication unit 102 is configured to determine whether the face translational track among the face action tracks is consistent with the requested face translational interaction track, further determine whether the face rotational track among the face action tracks is consistent with the requested face rotational interaction track, and if the two groups of tracks are both consistent, determine that the authentication is passed, otherwise determining that the authentication fails.

According to another embodiment, the interaction authentication unit 102 is further configured to determine whether the face action tracks are overlapped with a face rotational track, and if the face action tracks are overlapped with a face rotational track, determine that the authentication is passed, otherwise determine that the authentication fails. Because the face of a real person would generally rotate more or less during the process of translation, this solution, which execute identity authentication by determining whether the face action tracks are overlapped with a face rotational track, could be easily to be implemented, and could ensure that the authenticity of the identity which passes the authentication.

Specifically, during the process of the face interaction activities, which is made by the user following the interaction authentication indications, the face detecting and tracking unit 202 could be configured to track the face interaction activities and recognize the face outline area. The face rotational track could be the shifting track of the face mean line extracted from the face interaction information. If there is a shifting left or right of the face mean line, face rotation must exist. And the face translational track could be the face shifting path extracted from the face interaction information.

Figure 5:
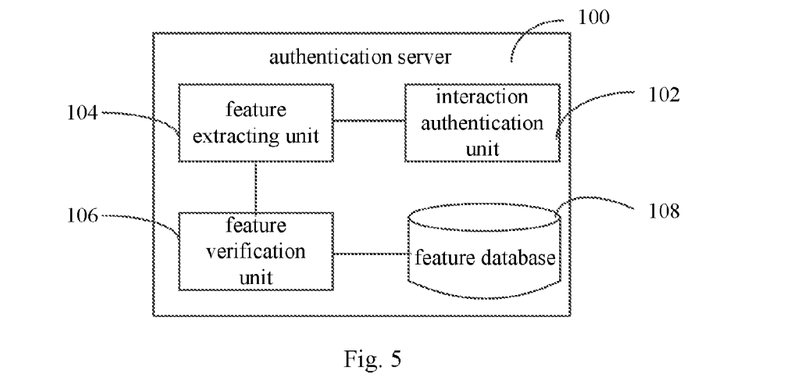
FIG. 5 is a block diagram of an authentication server according to one embodiment of the present disclosure.

Referring to FIG. 5, according to one of the embodiments, the authentication server 100 further comprises a feature extracting unit 104, a feature verification unit 106 and a feature database 108.

The feature extracting unit 104 is configured to receive a first face picture obtained by the authentication client 200 and extract the face feature from the first face picture; the feature verification unit 106 is configured to compare the face feature extracted from the first face picture with the pre-stored standard feature data, and if the face feature is consistent with the pre-stored standard feature data, notice the interaction authentication unit 102 to initiate the interaction authentication request; or otherwise determine that the authentication fails.

According to one of the embodiments, the authentication client 200 is configured to receive a user's registering request and collect the standard face pictures of the user; the feature extracting unit 104 is further configured to extract the standard feature data from the standard face pictures; in the current embodiment, the feature database 108 is configured to store the standard feature data.

According to one of the embodiments, the feature extracting unit 104 is further configured to receive a second face picture obtained by the authentication client 200 when the user finishes the face interaction activities, and extract the face feature from the second face picture; the feature verification unit 106 is further configured to compare the face feature extracted from the second face picture with the standard feature data that was previously stored in the feature database 108, and if the face feature of the extracted from the second face picture is consistent with the standard feature data, determine that the authentication is passed, otherwise determining that the authentication fails.

A specific application scenario is provided to illustrate the theory of the above method and system for identity authentication based on face recognition, as follows.

According to one of the embodiments, the authentication server comprises a face authentication server and an identity authentication server, and the identity authentication server includes an identity authenticating unit. The process of identity authentication based on face recognition includes two portions: registration and online face authentication.

Figure 6:
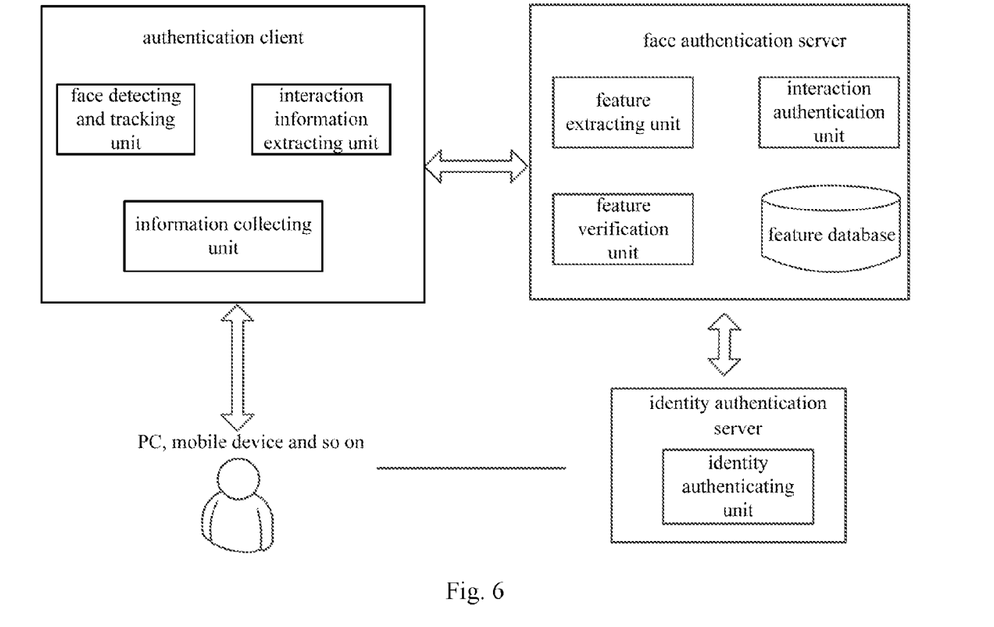
FIG. 6 is an application diagram of a system for identity authentication based on face recognition according to one embodiment of the present disclosure.
Figure 7:
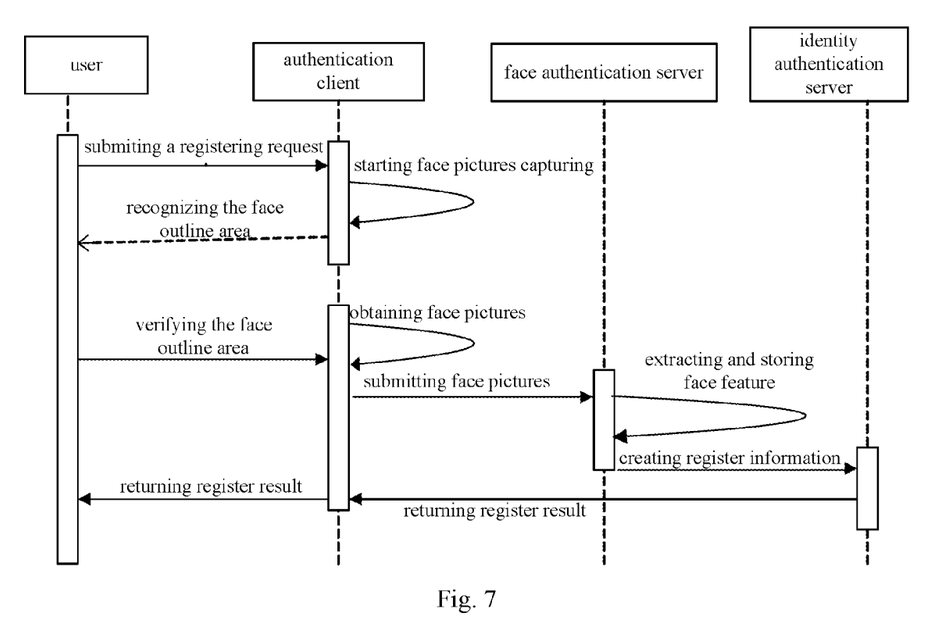
FIG. 7 is a sequential chart of registering face authentication according to one embodiment of the present disclosure.

According to one of the embodiments, referring to FIG. 6 and FIG. 7, the specific process of the registration includes steps as follows.

(1) A user submits a registering request for face authentication by using a PC or a mobile device. After the authentication client receives the registering request, the information collecting unit starts the driver software of a video device to take pictures. And the face detecting and tracking unit tracks the face interaction activities and recognizes the face outline area. After the user verifies the face outline area, the information collecting unit obtains face pictures and submits the face pictures to the face authentication server.

(2) After the face authentication server receives the face pictures, the feature extracting unit extracts face feature from the face pictures, and stores the face feature in the feature database as standard feature data. And the face authentication server creates register information, including the correspondence of user identity to the standard feature data, and submits the register information to the identity authentication server.

(3) The authentication server returns register result, such as information about success or failure of the register, to the authentication client. The authentication client displays the register result to the user.

According to one of the embodiments, referring to FIG. 6 and FIG. 8, the specific process of the online face authentication includes steps as follows.

(1) When a user starts an application operation, such as registering, payment or downloading, by using a PC or a mobile device, the information collecting unit of the authentication client starts the driver software of a video device to control the video device of the PC or mobile device, such as a webcam, to take pictures. And the face detecting and tracking unit tracks the face interaction activities and recognizes the face outline area. After the user verifies the face outline area, the information collecting unit obtains a first face pictures and submits the first face pictures to the face authentication server.

(2) The feature extracting unit of the face authentication server extracts the face feature from the first face picture, compares the face feature extracted from the first face picture with the pre-stored standard feature data. If the face feature is consistent with the standard feature data, the feature extracting unit submits the consistence comparison result, referring to the "comparison result a" in the FIG. 8, to the identity authentication server, and initiates a face interaction authentication request and sends the face interaction authentication request to the authentication client.

(3) The authentication client receives the face interaction authentication request, generates face interaction authentication indications and displays the face interaction authentication indications. The user could perform face interaction activities according to the face interaction authentication indications. When the user is performing face interaction activities, the information collecting unit of the authentication server records the process of face interaction activities, including tracking the face interaction activities, capturing face pictures at a prescribed time intervals such as one picture per second, and so on. When the face interaction activities are completed, the user gives a confirmation instruction to finish the face interaction action. After receiving the confirmation instruction, the interaction information extracting unit of the authentication client extracts face interaction information. The interaction information could be face pictures or face videos that are taken during a preset time period, and the preset time period could be appointed in the face interaction authentication request. And then the interaction information extracting unit obtains a second face picture when the user finishes the face interaction activities, and submits the interaction information and the second face picture to the face authentication server.

Figure 8:
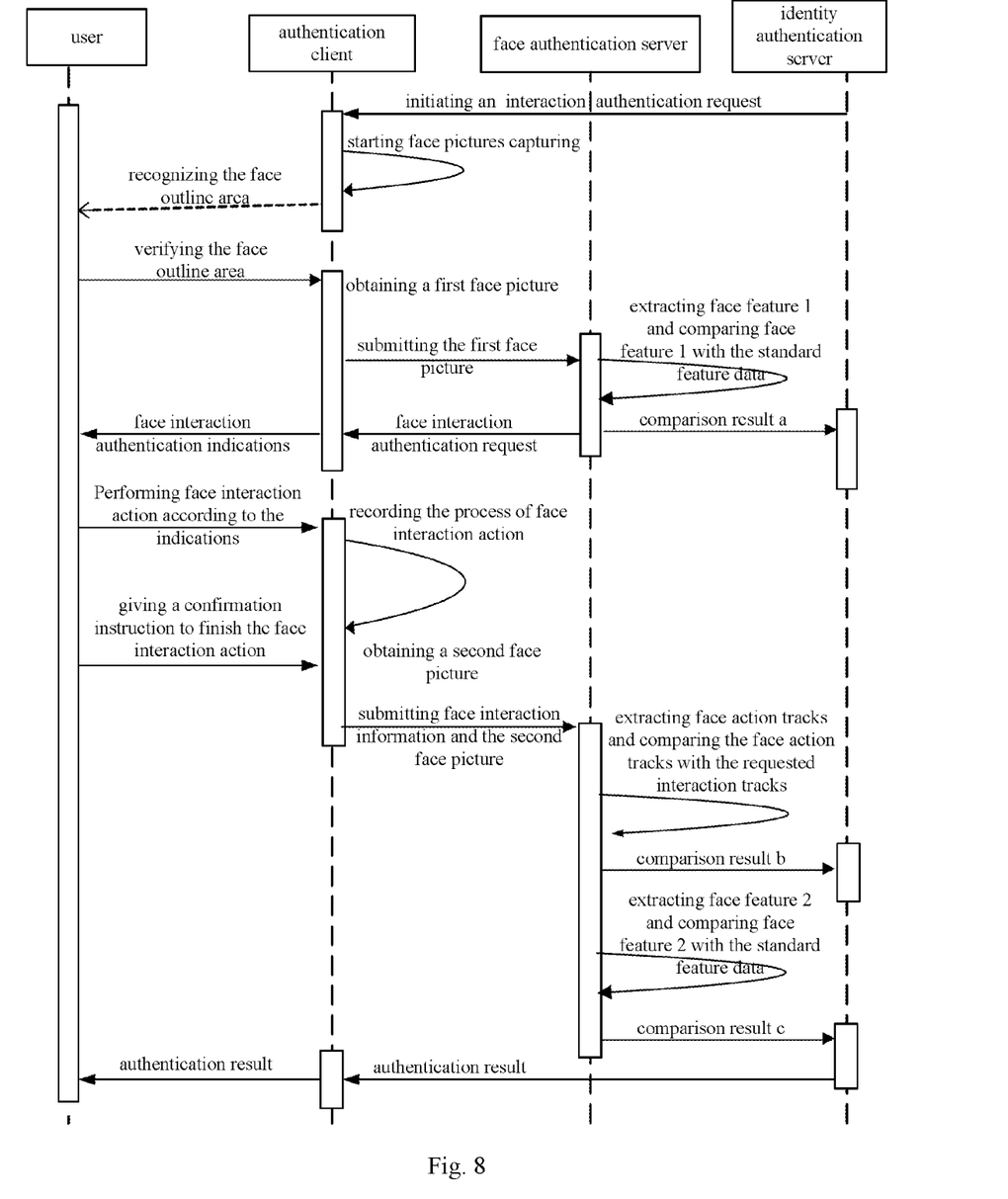
FIG. 8 is a sequential chart of identity authentication based on face recognition according to one embodiment of the present disclosure.

(3) The interaction authentication unit of the face authentication server extracts face action tracks from the face interaction information, determines whether the face action tracks are consistent with the requested interaction tracks, and if the face action tracks are consistent with the requested interaction tracks, submits the consistence comparison result, referring to the "comparison result b" in the FIG. 8, to the identity authentication server. The feature extracting unit of the face authentication server extracts the face feature from the second face picture, compares the face feature extracted from the second face picture with the pre-stored standard feature data. If the face feature is consistent with the standard feature data, the feature extracting unit submits the consistence comparison result, referring to the "comparison result c" in the FIG. 8, to the identity authentication server.

(4) If the received "comparison result a", "comparison result b" and "comparison result c" are all consistence comparison results, the identity authentication server determines that the authentication is passed and permit the user to continue the application operating. If any one of the comparison results is not consistence comparison result, the identity authentication server determines that the authentication fails. At last, the identity authentication server returns the authentication result to the PC or mobile device which is used by the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A method for identity authentication based on face recognition comprising:
   initiating an interaction authentication request which comprises requested interaction tracks, and sending the interaction authentication request to an authentication client;
   receiving face interaction information sent by the authentication client;
   extracting face action tracks from the face interaction information;
   determining whether the face action tracks are consistent with the requested interaction tracks; and
   generating interaction authentication indications according to the interaction authentication request, and displaying the interaction authentication indications, by the authentication client.

2. The method for identity authentication based on face recognition according to claim 1, wherein the interaction authentication request comprises requested face translational interaction track; and the step of determining whether the face action tracks are consistent with the requested interaction tracks comprises:
   determining whether a face translational track among the face action tracks is consistent with the requested face translational interaction track.

3. The method for identity authentication based on face recognition according to claim 1, wherein the interaction authentication request comprises requested face rotational interaction track; and the step of determining whether the face action tracks are consistent with the requested interaction tracks comprises:
   determining whether a face rotational track among the face action tracks is consistent with the requested face rotational interaction track.

4. The method for identity authentication based on face recognition according to claim 1, wherein the step of determining whether the face action tracks are consistent with the requested interaction tracks comprises:
   determining whether the face action tracks are overlapped with a face rotational track.

5. The method for identity authentication based on face recognition according to claim 1, wherein the method further comprises: the authentication client obtaining the face interaction information, which comprises:
   tracking face interaction activities that are made by the user following the interaction authentication indications;
   taking face pictures or face videos of the user's face interaction activities;
   extracting the face pictures or face videos that are taken during a preset time period according to the interaction authentication request.

6. The method for identity authentication based on face recognition according to claim 1, wherein before the step of initiating an interaction authentication request, the method further comprises:
   receiving a first face picture obtained by the authentication client, and extracting face feature from the first face picture;
   comparing the face feature extracted from the first face picture with pre-stored standard feature data, and if the face feature is consistent with the pre-stored standard feature data, entering the step of initiating an interaction authentication request.

7. The method for identity authentication based on face recognition according to claim 1, wherein the method further comprises:
   receiving a second face picture obtained by the authentication client when the user finishes the face interaction activities, and extracting the face feature from the second face picture;
   comparing the face feature extracted from the second face picture with pre-stored standard feature data, and determining whether the face feature from the second face picture is consistent with the pre-stored standard feature data.

8. The method for identity authentication based on face recognition according to claim 7, wherein before the step of receiving a first face picture obtained by the authentication client, the method further comprises:
   receiving a user's registering request;
   collecting standard face pictures of the user;

extracting the standard feature data from the standard face pictures and storing the standard feature data.

9. The method for identity authentication based on face recognition according to claim 1, wherein the interaction authentication request further comprises a time period for the face interaction activities, and the method further comprises:

obtaining a start time and a finish time of the user's face interaction activities, and determining whether the start time and the finish time are within the time period.

10. A system for identity authentication based on face recognition, comprising: an authentication client and an authentication server; and the authentication server comprising an interaction authentication unit; wherein the interaction authentication unit is configured to initiate an interaction authentication request which comprises requested interaction tracks, and to send the interaction authentication request to the authentication client;

the authentication client is used for obtaining face interaction information and sending the face interaction information to the authentication server;

the interaction authentication unit is further configured to extract face action tracks from the face interaction information, and determine whether the face action tracks are consistent with the requested interaction tracks; and the authentication client is further used for generating interaction authentication indications according to the interaction authentication request, and displaying the interaction authentication indications.

11. The system for identity authentication based on face recognition according to claim 10, wherein the interaction authentication request comprises requested face translational interaction track; and the interaction authentication unit is configured to determine whether a face translational track among the face action tracks is consistent with the requested face translational interaction track.

12. The system for identity authentication based on face recognition according to claim 10, wherein the interaction authentication request comprises requested face rotational interaction track; and the interaction authentication unit is configured to determine whether a face rotational track among the face action tracks is consistent with the requested face rotational interaction track.

13. The system for identity authentication based on face recognition according to claim 10, wherein the interaction authentication unit is configured to determine whether the face action tracks are overlapped with a face rotational track.

14. The system for identity authentication based on face recognition according to claim 10, wherein the authentication client comprises a face detecting and tracking unit, an information collecting unit and an interaction information extracting unit;

the face detecting and tracking unit is configured to track face interaction activities that are made by the user following the interaction authentication indications;

the information collecting unit is configured to take pictures or videos of the user's face interaction activities;

the interaction information extracting unit is configured to extract the face pictures or face videos that are taken during a preset time period according to the interaction authentication request.

15. The system for identity authentication based on face recognition according to claim 10, wherein the authentication server further comprises a feature extracting unit and a feature verification unit;

the feature extracting unit is configured to receive a first face picture obtained by the authentication client, and extract face feature from the first face picture;

the feature verification unit is configured to compare the face feature extracted from the first face picture with pre-stored standard feature data, and notice the interaction authentication unit to initiate an interaction authentication request if the face feature is consistent with the pre-stored standard feature data.

16. The system for identity authentication based on face recognition according to claim 15, wherein the feature extracting unit is further configured to receive a second face picture obtained by the client when the user finishes the face interaction activities, and extract the face feature from the second face picture; and the feature verification unit is further configured to compare the face feature extracted from the second face picture with pre-stored standard feature data, and determine whether the face feature from the second face picture is consistent with the pre-stored standard feature data.

17. The system for identity authentication based on face recognition according to claim 16, wherein the authentication client is further used for receiving a user's registering request and collect standard face pictures of the user; and the feature extracting unit is further configured to extract the standard feature data from the standard face pictures; and the authentication server further comprises an feature database for storing the standard feature data.

18. The system for identity authentication based on face recognition according to claim 10, wherein the interaction authentication request further includes a time period for the face interaction activities; and the interaction authentication unit is further configured to obtain the start time and the finish time of the user's face interaction action and determine whether the start time and the finish time are within the time period.

19. An authentication server comprising storage medium and at least one processor, wherein the storage medium is used for storing at least one program executable by the at least one processor; the at least one program comprises:

a first unit configured to initiate an interaction authentication request which comprises requested interaction tracks, and send the interaction authentication request to an authentication client;

a second unit configured to receive face interaction information sent by the authentication client;

a third unit configured to extract face action tracks from the face interaction information; and a fourth unit configured to determine whether the face action tracks are consistent with the requested interaction tracks, where the authentication client is further used for generating interaction authentication indications according to the interaction authentication request, and displaying the interaction authentication indications.

* * * * *